United States Patent
Lewis (10) Patent No.: US 12,430,440 B2
(45) Date of Patent: Sep. 30, 2025

(54) SYSTEM AND METHOD FOR FIRMWARE SECURITY EVENT MITIGATION

(71) Applicant: Insyde Software Corp., Taipei (TW)

(72) Inventor: Timothy Andrew Lewis, El Dorado Hills, CA (US)

(73) Assignee: Insyde Software Corp., Taipei (TW)

(*) Notice: Subject to any disclaimer, the term of this patent is extended or adjusted under 35 U.S.C. 154(b) by 281 days.

(21) Appl. No.: 17/739,832

(22) Filed: May 9, 2022

(65) Prior Publication Data

US 2022/0358222 A1 Nov. 10, 2022

Related U.S. Application Data

(60) Provisional application No. 63/186,522, filed on May 10, 2021.

(51) Int. Cl.
*G06F 21/57* (2013.01)
*G06F 9/54* (2006.01)
*G06F 21/55* (2013.01)

(52) U.S. Cl.
CPC ............ *G06F 21/572* (2013.01); *G06F 9/545* (2013.01); *G06F 21/554* (2013.01)

(58) Field of Classification Search
CPC ....... G06F 21/572; G06F 9/545; G06F 21/554
See application file for complete search history.

(56) References Cited

U.S. PATENT DOCUMENTS

| | | | | |
|---|---|---|---|---|
| 6,922,722 B1 * | 7/2005 | Mann | ...................... | H04L 67/34 709/224 |
| 7,206,833 B1 * | 4/2007 | Sarangam | ............... | H04L 41/06 709/224 |
| 8,874,892 B1 * | 10/2014 | Chan | ...................... | G06F 21/572 713/100 |
| 10,855,674 B1 * | 12/2020 | Geusz | ...................... | H04L 63/20 |
| 11,036,543 B1 * | 6/2021 | Swanson | ............... | G06F 13/102 |
| 2004/0123090 A1 * | 6/2004 | Zimmer | ............... | G06F 9/4401 713/1 |
| 2004/0236960 A1 * | 11/2004 | Zimmer | ............... | G06F 21/561 713/188 |
| 2005/0086523 A1 * | 4/2005 | Zimmer | ............... | H04L 63/145 726/4 |
| 2009/0300415 A1 * | 12/2009 | Zhang | ................. | G06F 11/2284 714/E11.023 |
| 2011/0320798 A1 * | 12/2011 | Zimmer | ............... | G06F 11/1092 713/1 |

(Continued)

FOREIGN PATENT DOCUMENTS

CN 108292342 A * 7/2018 ........... G06F 21/554

OTHER PUBLICATIONS

NPL Search History (Year: 2023).*

(Continued)

*Primary Examiner* — Michael Pyzocha
(74) *Attorney, Agent, or Firm* — McCarter & English, LLP (57) ABSTRACT

Systems and methods for performing security event mitigation with firmware are discussed. A firmware-based security event framework receives notifications of security events occurring in a firmware-controlled operating environment on a computing platform, logs information related to the event and optionally performs mitigation operations to address the security event.

13 Claims, 5 Drawing Sheets

(56) References Cited

U.S. PATENT DOCUMENTS

| | | | |
|---|---|---|---|
| 2013/0013905 A1* | 1/2013 | Held | G06F 21/572 |
| | | | 713/2 |
| 2013/0067534 A1* | 3/2013 | Soffer | G06F 3/0227 |
| | | | 726/34 |
| 2014/0075549 A1* | 3/2014 | Lewis | G06F 3/04883 |
| | | | 726/19 |
| 2016/0077905 A1* | 3/2016 | Menon | G06F 11/3648 |
| | | | 714/37 |
| 2016/0212159 A1* | 7/2016 | Gupta | G06F 21/54 |
| 2016/0217283 A1* | 7/2016 | Liu | G06F 21/572 |
| 2016/0378576 A1* | 12/2016 | Jayakumar | G06F 9/542 |
| | | | 719/318 |
| 2017/0061130 A1* | 3/2017 | Ghafoor | G06F 9/4406 |
| 2017/0262352 A1* | 9/2017 | Jeansonne | G06F 21/566 |
| 2018/0096151 A1* | 4/2018 | Ghetie | G06F 21/575 |
| 2018/0203629 A1* | 7/2018 | Poornachandran | G06F 21/76 |
| 2018/0232521 A1* | 8/2018 | Jeansonne | G06F 21/572 |
| 2019/0207969 A1* | 7/2019 | Brown | G06F 21/552 |
| 2020/0042324 A1* | 2/2020 | Ayolasomyajula | G06F 9/542 |
| 2020/0050510 A1* | 2/2020 | Chien | G06F 11/1428 |
| 2020/0074086 A1* | 3/2020 | Bulygin | G06F 21/572 |
| 2020/0250017 A1* | 8/2020 | Samuel | G06F 9/542 |
| 2020/0257521 A1* | 8/2020 | Jayakumar | G06F 21/572 |
| 2021/0026967 A1* | 1/2021 | Suryanarayana | G06F 21/575 |
| 2021/0397713 A1* | 12/2021 | Ndu | G06F 13/24 |
| 2022/0148675 A1* | 5/2022 | Chin | G06F 1/3287 |
| 2022/0222349 A1* | 7/2022 | Lambert | G06F 13/4282 |
| 2022/0358222 A1* | 11/2022 | Lewis | G06F 21/562 |
| 2023/0018085 A1* | 1/2023 | Khatri | H04L 9/0897 |

OTHER PUBLICATIONS

NPL Search History (Year: 2024).*
Brais, Visual C++ Support for Stack-Based Buffer Protection. MSDN Magazine, Retrieved online at: https://docs.microsoft.com/en-us/archive/msdn-magazine/2017/december/c-visual-c-support-for-stack-based-buffer-protection. Dec. 2017;32(12)14 pages.
Endicott, Secured-core PCs protect your data down to the hardware. Windows Central, Retrieved online at: https://www.windowscentral.com/secured-core-pcs-use-hardware-isolation-and-firmware-level-protection-secure-devices. 3 pages, Oct. 21, 2019.
Igor's Blog, In-depth dive into the security features of the Intel/Windows platform secure boot process. Retrieved online at: https://igor-blue.github.io/2021/02/04/secure-boot.html. 19 pages, Feb. 4, 2021.
Yao et al., Intel® Platform Firmware Resilience (Intel® PFR). Understanding UEFI Secure boot Chain. tianocore. Retrieved online at: https://edk2-docs.gitbook.io/understanding-the-uefi-secure-boot-chain/looking_forward__platform_firmware_resiliency/intel_platform_firmware_resilience_intel_pfr. 4 pages, Jun. 2019.
Yao et al., Stack Canaries. A Tour Beyond BIOS—Security Enhancement to Mitigate Buffer Overflow in UEFI. tianocore, Retrieved online at: https://edk2-docs.gitbook.io/a-tour-beyond-bios-mitigate-buffer-overflow-in-ue/stack_canaries. Mar. 2018.

* cited by examiner

SYSTEM AND METHOD FOR FIRMWARE SECURITY EVENT MITIGATION

BACKGROUND

Computing platforms (servers, desktop and mobile computing devices, smartphones, etc.) are initialized by firmware included within the platform and this firmware provides a range of software services which facilitate the boot of the operating system (OS) as well as providing a smaller subset of these services that continue to be available after the operating system for the platform has booted. Firmware is software that has been written onto non-volatile Read-Only Memory (ROM) modules including, but not limited to, ROM, PROM, EPROM, EEPROM, and Flash memory (collectively referred to hereafter as "ROM"). A characteristic of non-volatile memory is that it retains data when power is withdrawn. In contrast, volatile memory loses data in the absence of power. For example, volatile Random Access Memory (RAM) loses its data when a computer is shut down while the various types of non-volatile ROM maintain their data through shutdown and re-boot. Among other services, the firmware is responsible for operation of the computing platform until a boot process can be run which loads an operating system for the computing platform into memory. Once loaded, the operating system is in charge of normal operation of the computing platform although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing platform such as, but not limited to, a Personal Computer (PC). The UEFI specification describes a set of tools by which a computing platform can move in an organized fashion from the power-applied state to fully operational. The specification tells the desired result but deliberately does not specify the internal tactic of implementation. The UEFI firmware specification replaces earlier OS/firmware interfaces previously used by the industry and commonly known as legacy BIOS.

When implemented in a computing platform, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing platform, the system executes a process called reset which clears the state to a known condition and begins execution of the firmware. The firmware is read from the flash ROM or other ROM in the computing platform.

Many computing platforms contain one or more processing elements such as Central Processing Units (CPUs) which, when in operation, can read from and also erase and/or write flash ROM. The CPU may have a normal operating mode and a second operating mode called System Management Mode (SMM). When the CPU is in normal operating mode it can access all elements of the computing platform except certain memory regions exclusively dedicated to SMM mode. In contrast, when the CPU is operating in SMM mode it is able to access all elements of the computing platform including the dedicated memory. An electrical signal is made available within the circuitry of the computing platform which can indicate when the CPU is operating within SMM. The CPU may be directed to transition from normal operating mode to SMM by a number of triggers called System Manage Interrupt (SMI) events including SMI events triggered by software or firmware. The exact triggers available differ somewhat from among system designs but the result when the platform-appropriate trigger is used is that execution in main memory is immediately suspended and execution begins at a specific location in SMM memory.

BRIEF SUMMARY

Embodiments of the present invention provide a firmware-based security event framework to mitigate the impact of security events occurring in a firmware-controlled operating environment on a computing platform. The security event framework provides a standardized firmware-based mechanism for to report and mitigate relevant information about runtime security events occurring in a firmware-controlled operating environment. The runtime security events may include hardware-detected security errors, compiler-detected security errors, firmware kernel-detected security errors, motherboard device-detected errors and/or OEM code-detected security errors. Upon detection of a security event, embodiments may reset the computing platform into a clean environment, report the security events and, mitigate the security event on the next boot using a number of different approaches, including, in some cases, blocking the loading of the impacted module causing the detected security event.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Embodiments of the present invention provide firmware-based techniques for mitigating detected security events occurring on a computing platform as a result of the execution of code in a firmware-controlled operating environment such as the early portion of the boot process for the computing platform and in various runtime operating environments that run outside of the control and security provisions of the main hypervisor or operating system on the computing platform. Information about the detected security events may be logged by the firmware prior to resetting the computing platform to a clean environment. The logged information may be provided to a user or process and mitigation steps, optionally including the prevention of loading of the module causing the detected security event, may be taken on the subsequent boot of the computing platform.

As used herein, the following terms have the following meaning unless a different meaning is clearly apparent from the context in which the term is used:

System Management Interrupt (SMI) refers to the highest priority interrupt in x86 systems. Detected on instruction boundaries, it places a CPU core into SMM, saves some CPU registers at a pre-defined memory location and begins execution at a pre-defined entry point in SMRAM. It is also referred to as Management Mode Interrupt (MMI) in later UEFI specifications.

SMM refers to System Management Mode. It is a CPU execution mode entered upon detection of an SMI. SMM is also referred to as Management Mode (MM) in later UEFI specifications.

SMRAM refers to System Management RAM, a dedicated memory region that is only visible while a CPU is executing in SMM. SMRAM is also referred to as Management Mode RAM (MMRAM) in later UEFI specifications.

The firmware of the average computing system has a unique, privileged position with regard to the security of the platform. The firmware is responsible for initializing the security capabilities of the hardware, handing off control to a trusted operating system, and providing services at runtime. The firmware can do this because it operates within environments which have few protections or which have an elevated level of privilege. These privileged environments include the early portion of the boot process and in various runtime environments that run outside of the control and security provisions of the main hypervisor or operating system. For example, one of these firmware-controlled operating environments occurs when one or more CPUs on the computing platform transitions to SMM in response to an SMI so that the code responsible for handling the SMI may be executed in an environment insulated from operating system processes.

The firmware of the average computing system is composed of numerous components. Some of these firmware components are provided by the computer manufacturer, either Original Equipment Manufacturer (OEM) or Original Design Manufacturer (ODM), some by the silicon vendor for the chipsets on the platform, some by open-source projects, some by 3rd party vendors and some by custom solution providers. Because of the privileges afforded to firmware, each of these firmware components could potentially contain a weakness which would allow an unauthorized user to gain some of the privileges of the firmware and tamper with data, expose privileged information or perform otherwise restricted operations. These weaknesses might be unintentional; the result of a bug or oversight in the code. Alternatively, the weaknesses might also be intentional, deliberately placed to give unintended access. On a given platform, the majority of the code in the firmware may be written by 3rd parties. For example, with UEFI, ~a majority of the source code may be 3rd party option ROM, reference code, OEM code, etc. written by someone other than an entity controlling the computing platform. Accordingly, even if a company writes 100% secure code, weaknesses still exist given the prevalence of $3^{rd}$ party code on the computing platform. A weakness in the code may be exploitable to perform an attack, at which point it is termed a vulnerability. This is not only true of the firmware as it was originally supplied by the computer manufacturer, but is also true of devices where the firmware has been modified to add new code which exposes some new weakness. Such firmware modification often takes place after the firmware has left the manufacturer but before it reaches its intended user—a so-called supply chain attack.

Tracking the weaknesses in a large body of code such as that which includes the average platform firmware image, as well as the weaknesses that might be implanted in the firmware image, is a daunting task. Best security development practice assumes that there are weaknesses and that these weaknesses will be discovered eventually. To address these vulnerabilities, one type of response is to provide a "defense-in-depth" with three phases, a protection phase, a detection phase and a response phase. Rather than a means of protecting against an attack, defense-in-depth assumes that there will be, or has been, an attack and focuses instead of how to limit the damage done by such an attack. That is, the first defense against attacks has failed (Protect) and the second defense against attacks (Detect) identifies the attack. Recent advances within the firmware community, using software and hardware capabilities can detect errant behavior either during the creation of the firmware or at runtime. Embodiments of the present invention provide firmware-based techniques in the third phase of the defense-in-depth approach (Response) to seek to limit the potential damage of an attack by adding additional reporting and mitigation facilities to platform firmware as described further herein.

Figure 1:
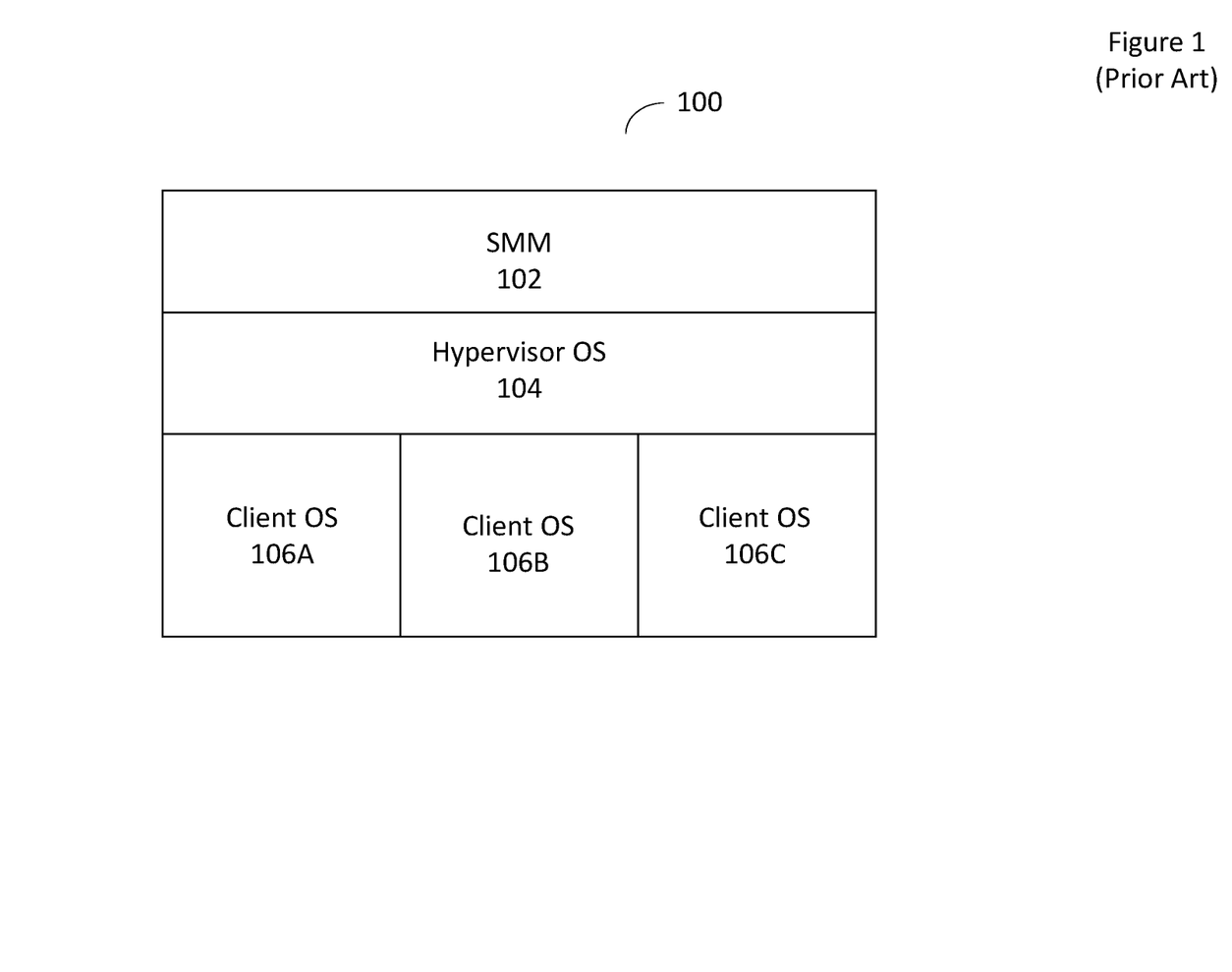
FIG. 1 depicts an illustration of exemplary runtime security boundaries in a server system.

FIG. 1 depicts an illustration of exemplary runtime security boundaries in a server system. As illustrated, a typical server 100 may contain SMM code 102 that runs in a privileged firmware-controlled operating environment. The server may also include a hypervisor OS 104 that allows the server to support multiple virtual machines that each have their own client OS 106a, 106b and 106c. Traditional security concerns have included protecting the SMM code from the client OS and/or the hypervisor OS, while also protecting the hypervisor OS from the various client OS's and protecting the client OS's from each other. However, given the elevated privileges afforded firmware it should be appreciated that it is also important to protect the hypervisor OS and client OS from the SMM code running in a firmware-controlled environment and embodiments attempt to address these latter concerns.

Figure 2:
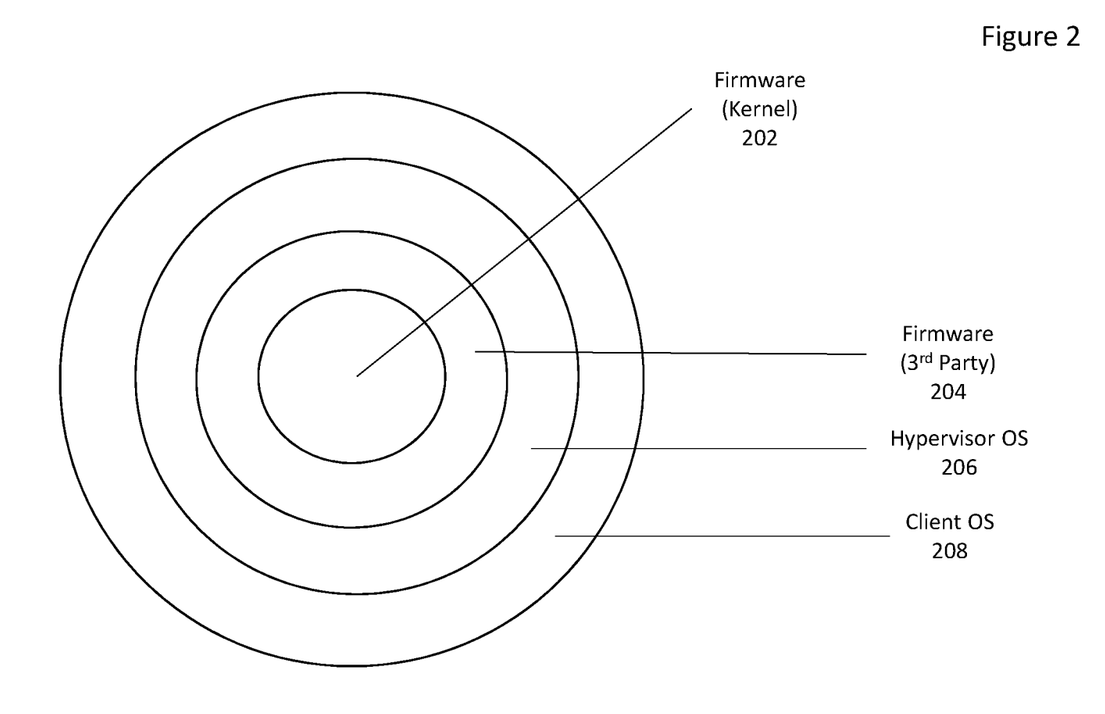
FIG. 2 illustrates an exemplary security model with relative privilege levels.

FIG. 2 illustrates an exemplary security model demonstrating relative privileges amongst the different types of code running on the platform. As illustrated the firmware kernel 202 has higher privileges than the 3rd party firmware 204. The 3rd party firmware 204 has higher privileges than the hypervisor OS 206 which in turn has higher privileges than the various client OS's 208. As depicted, any security issue in the firmware kernel 202 or $3^{rd}$ party firmware 204 presents a security risk to the hypervisor OS 206 or the client OS 208 due to the higher privileges afforded the firmware.

Within the OS environment, security event detection capabilities are available and benefit from the fact that any detected offending modules can be isolated, events can be logged, the user can be notified and modules can be disabled. Unfortunately a similar ability to isolate modules in a UEFI firmware environment is not available. The UEFI environment does not provide any mechanism to isolate the memory used by each driver. All UEFI drivers share a common pool of memory and UEFI drivers using the common UEFI services expect that data structures published by one driver are available without restriction. There is no provision for restricting the access to hardware devices or the address space of other UEFI drivers. Further, existing security technologies for firmware focus on protecting against tampering, leaking information or escalation of privilege and the mitigations available are limited to halting the system, in most cases with little or no information made available to the user or tools to mitigate future security weaknesses. Embodiments attempt to address these deficiencies via firmware-based techniques that provide additional information to the user and/or IT administrator and additional mitigation options for the detected security event. More particularly, to address these challenges, embodiments of the present invention provide a standardized security event framework where security events occurring in a firmware-controlled operating environment can be reported and logged, the system can be reset into a secure early boot environment, a user or designated individual may be notified, and appropriate mitigation for the security event can be performed that optionally includes blocking the affected module from loading. In one embodiment, the security event framework may be implemented as one or more firmware modules operating in the firmware kernel that receive notification of security events occurring in a firmware-controlled operating environment from disparate sources and performs the logging and mitigation steps described herein.

The firmware on a computing platform, much of which may be 3rd party code, may intentionally or unintentionally allow others to steal secrets, tamper with data, alter program flow or artificially escalate privileges. Embodiments reduce this risk by using software/hardware technology to catch these errors at runtime and do something about them. This approach is not a hack prevention technique as much as a hack risk reduction solution. In order to handle security weaknesses reported in 3rd party code, the firmware kernel manages hardware and software security resources that detect security events at runtime. This 3rd party code may include reference code, software features, OS loaders, open-source and silicon support code. The security event framework handles security weaknesses by protecting the platform using the hardware and software security resources, logging the security events and then providing various means to mitigate their impact.

The security event framework provided by embodiments of the present invention performs three functions. The security event framework detects and protects against certain BIOS security events when firmware kernel code or 3rd party firmware code weaknesses are exploited at runtime. Additionally, the security event framework logs and reports the security events to a user, IT administrator, or process. Further, the security event framework may implement one or more mitigations to prevent further security events from the same source.

In one embodiment, there are five basic classes of security events handled by the security event framework. The first class of security event is detected using CPU and chipset resources to generate security events when certain suspicious behaviors are detected. This first class of detections can be further broken down into the following general areas:

1. Memory areas that should not have code access are marked as NX (no execution) or NP (not present) or not writable. The firmware maintains and modifies the CPU page table for each environment, such as MM, PEI or DXE. The page tables may be different based on the expected behavior of the drivers within that environment. For example, SMM drivers are generally expected to not write to any memory except SMRAM and memory allocated in DXE from ACPI Reserved or ACPI NVS memory. When a page fault happens, a CPU exception is generated and, within the CPU exception handler, the information related to the CPU exception is recorded as a security event. The information can include the address of the fault, the address of the attempted access, the type of access attempted, etc. The information can also include deduced information, such as the driver that caused the fault. The information can also include a crash dump that includes items such as the complete system state. After the information is recorded, the system can use the default page fault processing or perform a reset or shutdown. This includes memory owned by the operating system, areas marked as boot data, stack, unused memory in the heap and sensitive memory areas (around address zero, memory mapped I/O, etc.) This marking of memory areas may be done as part of a silicon vendor's security initiatives (e.g.: Intel's Copper Point™, Devil's Gate Rock™ and AMD's SystemGuard)™.

2. In some cases, the chipset can be configured to generate an SMI when access to certain regions are detected, including memory-mapped flash addresses and locked memory-mapped I/O. The SMI handler can record the address of the fault and report the event type and related information as part of the security event framework.

3. Access to restricted registers or use of certain privileged instructions will generate a general-protection fault. This happens when executing in ring 3 in a hierarchical protection domain, the least privileged level (usually application programs) or when certain Model-Specific Registers (MSRs) are made inaccessible after a certain point in the boot process or in certain CPU operating modes (like SMM). The fault handler can record the address of the fault and report the event type and related information as part of the security event framework described herein.

The second class of security event detections is performed using code injected by the compiler during the build process. The injected code runs in a firmware-controlled environment and is designed to detect common buffer overflow or integer arithmetic faults used by attackers to compromise existing code and cause it to do exceptional behavior. This injected code reports the security event using a compiler-specific set of library functions. Embodiments provide custom libraries designed to work in the firmware environment and call a security event reporting function to record the event type and event information. As non-limiting examples, in the Microsoft™ compiler family, there are several compiler flags that add these runtime checks, including /RTC, /GS and /sdl. In Clang, these similar features are all added using the -fsanitize. For the gcc family of compilers -fstack_check, -fstack-protector, -gnatV, -gnato may be used to add runtime checks.

Similarly, another "code injection" strategy may be used that relies on the CR, ASSERT and VERIFY macros. These macros are commonly used to detect exceptional runtime conditions, many of which could be a symptom of a security weakness. Normally the ASSERT and CR macros are empty in release builds. In debug builds, these generate additional code and library functions. Embodiments allow these macros to generate code and library calls to be active in normal builds in a similar fashion to debug builds. These macros perform runtime checks to make sure that certain conditions which should never happen generate a library call if they do occur and the library call can be used to generate a security event. This includes assertions detected within basic library functions.

The third class of security event detections detect certain suspicious behavior occurring in the firmware kernel. This includes handling of TPL (task priority level) errors, stack overflow, heap corruption, double-free errors, etc. It also includes other security related events such as, but not limited to: password retry count exceeded (such as detected by the firmware's password retry checkpoint code which counts the number of times a password is attempted), firmware chain-of-trust failures (e.g. based on a flash device map hash) and security validation failures for signed 3rd party code (using for example the UEFI Security Architecture Protocol or the UEFI certificate database 'db').

A fourth class of detections are OEM-defined security events. Embodiments provide a hook during the early part of the boot process on the computing platform that allows OEM code to detect and report security events. This may be done through a SECURITY_EVENT checkpoint. The checkpoint handlers call the same event reporting library.

A fifth class of security event detections involves device authentication in which certain motherboard devices report their security status. The EDKII_DEVICE_SECURITY_PROTOCOL allows several classes of devices that are enumerated by the UEFI BIOS to report their security status. These devices include: PCI, USB, SCSI, ATA/SATA, NVM, SDMMC. In one embodiment, these devices report their security status to the security event framework. When the security status indicates an issue with the device, the security event framework firmware prevents the devices with authentication issues from being enabled and logs and report the issues.

In another embodiment, techniques provided by the SPDM specification from DMTF (formerly known as the Distributed Management Task Force) are used to validate the firmware of motherboard devices to determine whether it has been tampered with, and if so, to disable the devices. Such tampering may be logged and reported as a security incident by embodiments. In one embodiment Management Component Transport Protocol (MCTP) (a protocol used over Intelligent Platform Management Interface (IPMI) for on-board server devices) and Peripheral Component Interconnect's (PCI's) Data Object Exchange (DOE) are used to report the security incidents.

Figure 3:
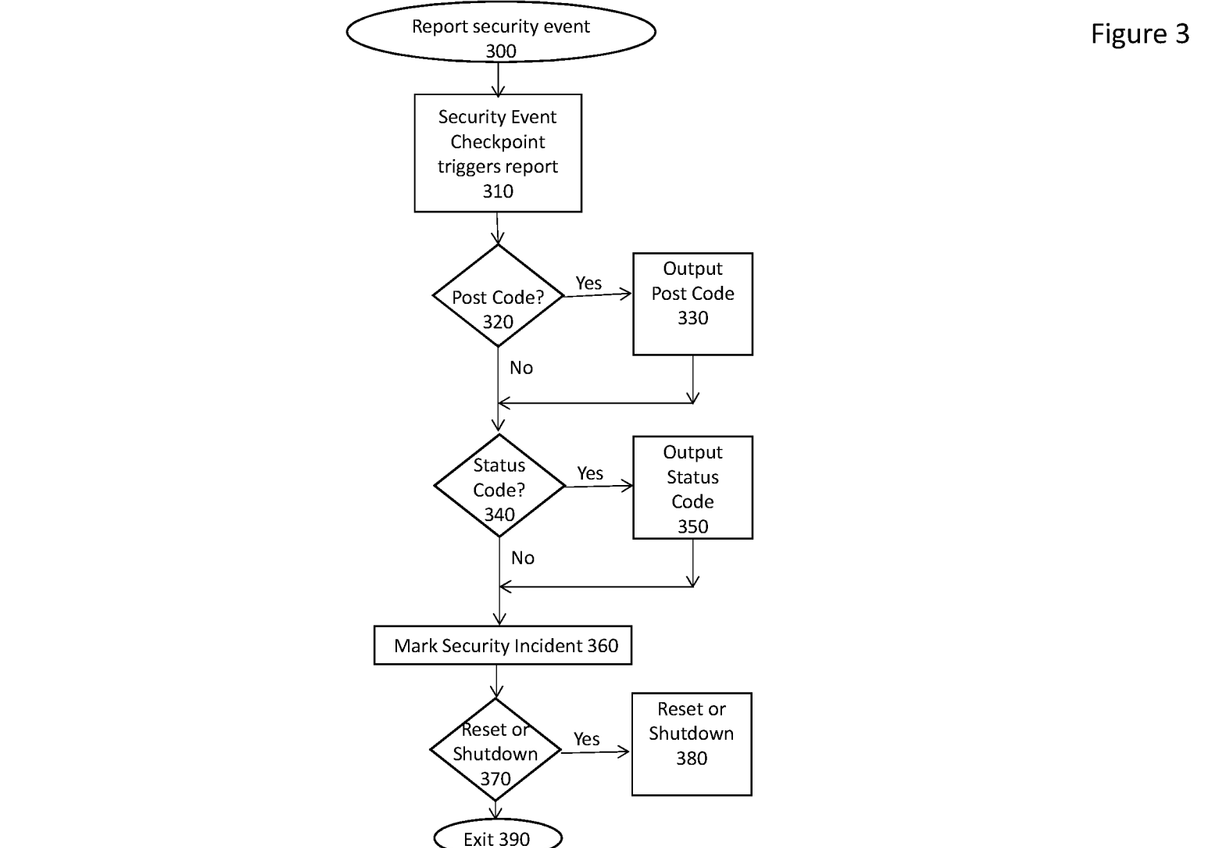
FIG. 3 depicts an exemplary security event reporting flow from a library function in an exemplary embodiment.

When a security event is detected, the security event framework handler (e.g.: library, exception, ASSERT) gathers the information about the code that generated the exception, outputs one or more status codes, logs the event and then resets or shuts down the system. For example, FIG. 3 depicts an exemplary security event reporting flow from a library function provided by the security event framework in an exemplary embodiment. The reporting sequence 300 begins at a security event reporting checkpoint which may be during the boot sequence or during execution in another-firmware controlled operating environment such as SMM/MM (step 310). If a security event has been detected during the boot sequence, the library function determines if customized POST codes exist for the detected security event (step 320) in which case they may be logged and may be displayed and/or forwarded as part of a notification to a designated recipient (e.g.: IT administrator or user) (step 330). POST codes are simple numeric values that signify specific types of security incidents. If customized status codes exist for the detected security event (step 340), they are output (step 350). The status codes may be output using standard UEFI or Platform Initialization (PI) mechanisms (see for example ReportStatusCode( ) in the UEFI Platform Initialization specification, hereafter "PI specification"). Status codes may be routed to all specification-defined registered status code listeners, allowing platform-specific behavior to determine how they are reported to the user and trigger further actions. For example, the codes may be displayed, logged and/or they may change LED colors or trigger further security actions (status codes are described in the PI specification, volume 3, section 6.1.1). These status codes include the severity level of the security event such as debug, warning, etc., the basic category of the status code reporter such as computing unit, peripheral, I/O bus or software, and optional extended data specified by a GUID such as the device path of the error causing unit. The security event information is recorded for the next boot (step 360) and the reset or shutdown mitigations (examples of which are discussed below) are handled to address the security event on the next boot (step 370). The reset or shutdown of the computing platform is then triggered (step 380) and the sequence ends (step 390).

Security event information can be logged in many places. A preferred implementation is in UEFI variables or in TPM non-volatile storage, but the information may also be stored in the Baseboard Management Controller (BMC) or other forms of non-volatile storage.

In many embodiments, the security event framework described herein processes all mitigations on the subsequent boot. After reporting an event, the system may be reset or shutdown. However, in an alternative embodiment, some mitigations may be implemented without a reset or shutdown. The use of the reset/shutdown cycle approach has the advantage in that whatever code was executing that caused the security event will be removed from memory and the firmware kernel will have a chance to report the issue to a user or perform mitigations from a clean operating environment.

In some embodiments, the flow for mitigations on the subsequent boot involves alerting the user. The user might be physically present at the computer or might be a remote IT manager (or the alert may be sent to a computing process). Once the user or other recipient has been alerted, one or more mitigations may be applied to prevent the security event from re-occurring. This contrasts with conventional handling of security events that are detected within firmware-controlled operating environments where the only mitigation after detections is halting or shutting down the system. The conventional approach has several limitations as it always requires human presence to recover, there is no way to identify the resource causing the security event, and there is no way to continue operation of the platform safely.

In addition to the option of shutting down the computing platform, embodiments provide various additional mitigations, including:

(1) logging the security event into various user-accessible logs. These include the debug output, the SMBIOS log, an internal log of just security events, an external networked logging service and/or through a BMC or external controller;

(2) displaying a message. A preferred implementation halts the boot after reset and displays a dialog with the information about the security events detected. The information displayed may include the type of event, the module that caused the event, the severity of the event and the recommended mitigations (selectable by a user);

(3) sending an alert to a management service via the BMC, the in-band network controller, or a Wi-Fi/Bluetooth connection, or the alert can be sent to an owner or administrator using any of a variety of messaging services such as, but not limited to, SMS, Facebook Messenger™, Snap Chat™, WhatsApp™, WeChat™, LINE™, or a proprietary message application;

(4) blocking the affected module from executing. Using the recorded information about the address that caused the event, it is possible to determine which module caused the security event. The module information is recorded as part of the security event information and, on the next boot, the module is blocked from executing. One way to do this is to implement the Security Architecture Protocol in UEFI and, if it was the offending module, return a security error for that module;

(5) re-flashing the entire BIOS, the firmware volume that contained the module or the specific driver. In one embodiment, the user could indicate that re-flashing should happen, or it can happen automatically if a newer (or "golder") version is detected on a recovery device or on a remote server dedicated for this purpose. A preferred implementation is a capsule;

(6) blocking the affected module or re-flashing the specific module with a known-good version which is supported since when the security event is reported, the offending module can be recorded as part of the reported information. On the next boot, the module can be blocked (by, for example, using a list of blocked modules and the security architecture protocol). Or the module can be re-flashed by finding the offending module in the flash device (or EFI system partition) and loading a replacement from a disk or network;

(7) activating a requirement of an administrator password to boot the platform or enter setup; and (8) locking the system using the BMC to allow time for an authorized user or process to address the security event.

In some embodiments, mitigations can be decided by the user based on input in a dialog or a mitigation specified by the BMC or a remote user. The mitigation may not require an actual user, but may be specified based on a policy that may be per-machine-type, per-machine or per security event type. In some embodiments, the mitigations may occur without the use of a dialog.

Figure 4:
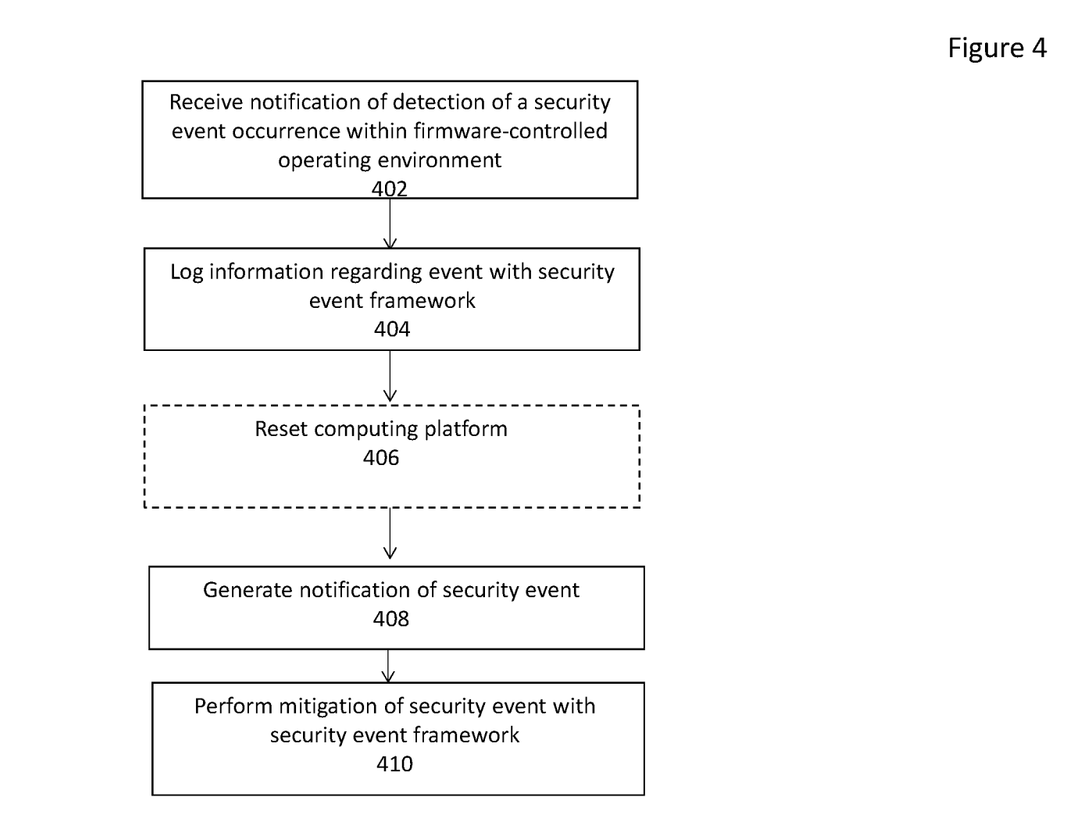
FIG. 4 depicts an exemplary sequence of steps for mitigating security events in an exemplary embodiment.

FIG. 4 depicts an exemplary sequence of steps for mitigating security events in an exemplary embodiment. The sequence begins with the detection of a security event occurring within a firmware-controlled operating environment (step 402). For example, the security event may be behavior detected while code is executing in SMM when the operating system has temporarily turned control of the computing platform over to the platform firmware. Alternatively the security event may be detected during a boot sequence prior to the OS assuming control of the computing platform. As discussed above, the code may be detected by a variety of hardware or software services managed by the firmware kernel. Information related to the detected security event is logged by the security event framework (step 404). For example the logged information may indicate the type and the source of the event and other related data. In some embodiments, the computing platform is then reset (step 406) and a notification of the security event is generated (step 408). For example, a notification may be generated for a user, an IT department/individual or an automated process. Following notification, various mitigations may be performed by the firmware of the security event framework (step 410) as discussed above to address the security event and prevent its re-occurrence. Following the mitigation, the firmware may return control of the computing platform to the operating system. In some embodiments, the mitigation may take place without resetting the platform.

Figure 5:
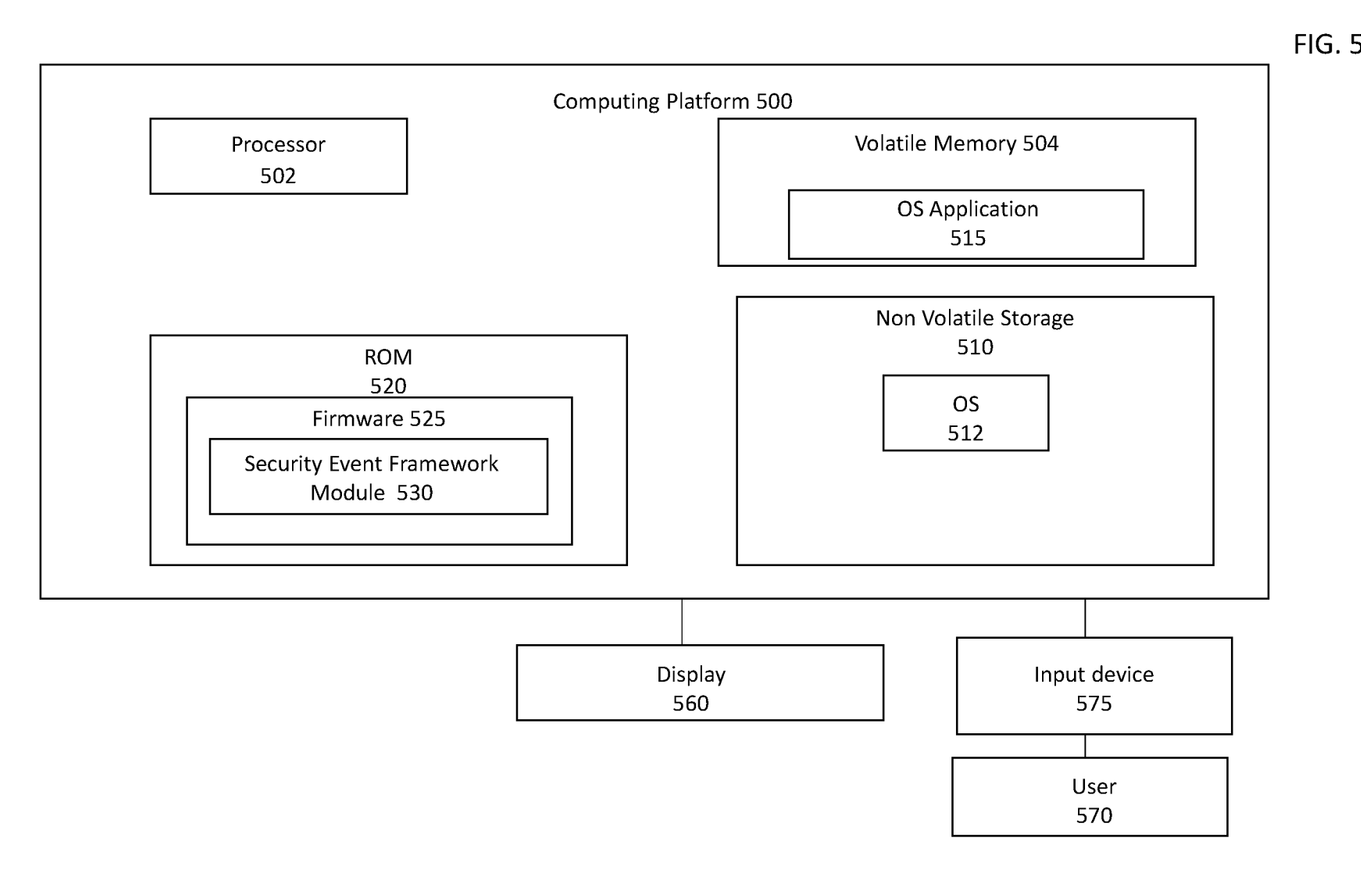
FIG. 5 depicts an exemplary computing platform suitable for performing embodiments of the present invention.

FIG. 5 depicts an exemplary computing platform 500 suitable for performing embodiments of the present invention. A computing platform 500 includes one or more processors 502 such as, but not limited to a central processing unit (CPU), and volatile memory such as random access memory (RAM) 504. The computing platform may be, but is not limited to, a server, desktop computer, laptop computer, mobile computing device, smartphone, medical device, etc. and may be equipped with one or more flash devices. The computing platform 500 may also include non-volatile storage 510 such as a hard drive holding an operating system (OS) 512 and Read Only Memory (ROM) 520 holding platform firmware 525. Firmware 525 may include modules for the security event framework 530 including functions for reporting and mitigating detected security events occurring within a firmware-controlled operating environment. ROM 520 may be flash memory and may be provided in the form of one or more NVDIMMs (not shown) that may each include Flash memory, DRAM and a memory controller. Firmware 525 may be executed during a boot sequence for the computing platform 500 as well as at other times (i.e.; during runtime). For example, firmware 525 may load OS 512 into volatile memory 504 for execution during the boot sequence and may update firmware data on the computing platform following a platform reset or during runtime as described herein. A user 570 may utilize an input device 575 such as a keyboard or touch screen to interact with computing platform 500. Display 560 may be integrated into computing platform 500 or may be a separate display surface.

Embodiments may be implemented as part of a Security Development Lifecycle (SDL) to enhance the security of the firmware. Various technology areas, starting with build-time processes and continuing to when the code is actually running may be analyzed and monitored to detect and mitigate security events. For example, in the SDL a static code analysis and code review may be performed at build time. The static code analysis may analyze the source code for common coding mistakes while the code review may check for compliance with security guidelines. At runtime, as described above, various compiler runtime protections may be employed that use injected code (injected during build time) for runtime checking of common security failures. Additionally, security testing that uses traditional and fuzzing tests for data that crosses trust boundaries may be employed. As discussed above, access control that prevents a module from accessing specified resources may be used as may be kernel protections that detect unsafe usage patterns and data corruption in the BIOS kernel At each level, security weaknesses can be prevented, detected and mitigated. This includes both modules where source code is available (reference code, kernel, etc.) or modules which are provided only as a binary (such as OS loaders, option ROMs). In one embodiment, damage from a security attack may be categorized using the DREAD model which considers Damage potential, Reproducibility, Exploitability, Affected Users and Discoverability, rating each consideration to determine an overall damage score.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory medium holding executable instructions for performing security event mitigation with firmware on a computing platform equipped with one or more processors, the instructions when executed causing the computing platform to:
receive notification of detection of an occurrence of a security event occurring within a privileged firmware-controlled operating environment running outside the control of a main hypervisor or operating system on the computing platform, the detection occurring during runtime following completion of a boot sequence for the computing platform and a transition of control to the privileged firmware-controlled operating environment from the main hypervisor or operating system,
wherein the security event detected is one of unauthorized memory access, unauthorized register access, unauthorized use of specified privileged instructions, buffer overflow or integer arithmetic faults;
log, with the firmware, information regarding the cause of the event in a non-volatile storage location;
generate, with the firmware, a notification of the security event;
reset the computing platform based on the detection before performing a mitigation of the security event and
perform, with the firmware, a mitigation of the security event after the resetting of the computing platform.

2. The medium of claim 1, wherein the mitigation blocks a firmware module from executing after the reset of the computing platform.

3. The medium of claim 1, wherein the mitigation re-flashes an entire BIOS image, a firmware volume that contains a module causing the security event, or a specific driver causing the security event.

4. The medium of claim 1, wherein the security event is caused by code executing when one or more processors of the computing platform are in System Management Mode.

5. The medium of claim 1, wherein the security event is detected using central processing unit and chipset resources.

6. The medium of claim 1, wherein the security event is detected at runtime using code injected by a compiler during build time.

7. A method for performing security event mitigation with firmware on a computing platform equipped with one or more processors, comprising:
receiving notification of detection of an occurrence of a security event occurring within a privileged firmware-controlled operating environment running outside the control of a main hypervisor or operating system on the computing platform, the detection occurring during runtime following completion of a boot sequence for the computing platform and a transition of control to the privileged firmware-controlled operating environment from the main hypervisor or operating system,
wherein the security event detected is one of unauthorized memory access, unauthorized register access, unauthorized use of specified privileged instructions, buffer overflow or integer arithmetic faults;
logging, with the firmware, information regarding the cause of the event in a non-volatile storage location;
generating, with the firmware, a notification of the security event;
resetting the computing platform based on the detection before performing a mitigation of the security event; and
performing, with the firmware, a mitigation of the security event after the resetting of the computing platform.

8. The method of claim 7, wherein the mitigation blocks a firmware module from executing after the reset of the computing platform.

9. The method of claim 7, wherein the mitigation re-flashes an entire BIOS image, a firmware volume that contains a module causing the security event, or a specific driver causing the security event.

10. The method of claim 7, wherein the security event is caused by code executing when one or more processors of the computing platform are in System Management Mode.

11. The method of claim 7, wherein the security event is detected using central processing unit and chipset resources.

12. The method of claim 7, wherein the security event is detected at runtime using code injected by a compiler during build time.

13. A computing platform, comprising:
one or more processors; and
firmware including a security event framework, the security event framework including one or more firmware modules that when executed:
receive notification of an occurrence of a security event occurring within a privileged firmware-controlled operating environment running outside the control of a main hypervisor or operating system on the computing platform, the detection occurring during runtime following completion of a boot sequence for the computing platform and a transition of control to the privileged firmware-controlled operating environment from the main hypervisor or operating system,
wherein the security event detected is one of unauthorized memory access, unauthorized register access, unauthorized use of specified privileged instructions, buffer overflow or integer arithmetic faults;
log, with the firmware, information regarding the cause of the event in a non-volatile storage location;
generate, with the firmware, a notification of the security event;
reset the computing platform based on the detection before performing a mitigation of the security event; and
perform, with the firmware, a mitigation of the security event.

* * * * *